US008047444B2

(12) United States Patent
Adams et al.

(10) Patent No.: US 8,047,444 B2
(45) **Date of Patent: *Nov. 1, 2011**

(54) METHOD, SYSTEM AND SMART CARD READER FOR MANAGEMENT OF ACCESS TO A SMART CARD

(75) Inventors: Neil Patrick Adams, Kitchener (CA); Michael E. McCallum, Elmira (CA); Dinah Lea Marie Davis, Waterloo (CA); Ravi Singh, Mississauga (CA); Richard Paul Sibley, Kitchener (CA); Herbert Anthony Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/846,931

(22) Filed: Jul. 30, 2010

(65) Prior Publication Data

US 2010/0288839 A1 Nov. 18, 2010

Related U.S. Application Data

(63) Continuation of application No. 11/687,331, filed on Mar. 16, 2007, now Pat. No. 7,766,243, which is a continuation-in-part of application No. 11/622,250, filed on Jan. 11, 2007, now Pat. No. 7,871,010.

(60) Provisional application No. 60/807,743, filed on Jul. 19, 2006.

(51) Int. Cl.
*G06K 19/06* (2006.01)

(52) U.S. Cl. ........................................ 235/492; 235/380

(58) Field of Classification Search .................. 235/380, 235/487; 711/115
See application file for complete search history.

(56) References Cited

U.S. PATENT DOCUMENTS

| | | | |
|---|---|---|---|
| 5,227,613 | A | 7/1993 | Takagi et al. |
| 6,199,128 | B1 | 3/2001 | Sarat |
| 6,256,690 | B1 | 7/2001 | Carper et al. |
| 6,317,829 | B1 | 11/2001 | Van Oorschot |
| 6,776,339 | B2 | 8/2004 | Piikivi |
| 6,824,064 | B2 | 11/2004 | Guthery et al. |
| 6,980,660 | B1 | 12/2005 | Hind et al. |
| 6,997,381 | B2 | 2/2006 | Arnouse |

(Continued)

FOREIGN PATENT DOCUMENTS

EP 1049306 11/2000

(Continued)

OTHER PUBLICATIONS

JSR 177 Expert Group, "Security and Trust Services API (SATSA) for Java™ 2 Platform, Micro Edition", Version 1.0, Java Community Press, pp. 86-95, Jul. 28, 2004.

(Continued)

*Primary Examiner* — Seung H Lee
*Assistant Examiner* — Sonji Johnson
(74) *Attorney, Agent, or Firm* — Bereskin & Parr LLP/S.E.N.C.R.L., s.r.l.

(57) ABSTRACT

The described embodiments relate generally to devices, methods and systems for managing access to a memory card, such as a smart card, by a plurality of accessing devices. Certain embodiments relate to a smart card reader (SCR) for managing access to a smart card by a plurality of accessing devices. The SCR comprises: a processor; a channel manager responsive to the processor for interfacing with the smart card; and a communication interface responsive to the channel manager for communicating with the plurality of accessing devices.

20 Claims, 10 Drawing Sheets

100
Memory Card 120
Card Reader 110
113
PC 130
114
113
Mobile Device 140
PC 130
Wireless Network 150

U.S. PATENT DOCUMENTS

| | | | |
|---|---|---|---|
| 7,013,365 | B2 | 3/2006 | Arnouse |
| 7,043,754 | B2 | 5/2006 | Arnouse |
| 7,139,914 | B2 | 11/2006 | Arnouse |
| 7,299,983 | B2 | 11/2007 | Piikivi |
| 7,418,717 | B1 | 8/2008 | Dolske et al. |
| 7,464,865 | B2 | 12/2008 | Brown et al. |
| 7,766,243 | B2 | 8/2010 | Adams et al. |
| 7,871,010 | B2 | 1/2011 | Adams et al. |
| 7,891,557 | B2 | 2/2011 | Brown et al. |
| 2002/0197956 | A1 | 12/2002 | Annola et al. |
| 2003/0136829 | A1 | 7/2003 | Hosogoe et al. |
| 2004/0255127 | A1 | 12/2004 | Arnouse |
| 2005/0045720 | A1 | 3/2005 | Fruhauf |
| 2005/0086479 | A1 | 4/2005 | Ondet et al. |
| 2005/0120096 | A1 | 6/2005 | Rekimoto et al. |
| 2005/0132151 | A1 | 6/2005 | Kuriyama |
| 2005/0139669 | A1 | 6/2005 | Arnouse |
| 2005/0168323 | A1 | 8/2005 | Lenoir et al. |
| 2005/0177735 | A1 | 8/2005 | Arnouse |
| 2006/0049243 | A1 | 3/2006 | Sakamura et al. |
| 2006/0129639 | A1 | 6/2006 | Purdy et al. |
| 2007/0055877 | A1 | 3/2007 | Persson et al. |
| 2007/0251997 | A1 | 11/2007 | Brown et al. |
| 2009/0095812 | A1 | 4/2009 | Brown et al. |

FOREIGN PATENT DOCUMENTS

| | | |
|---|---|---|
| EP | 1544809 | 6/2005 |
| EP | 1605627 | 12/2005 |
| EP | 1635508 | 3/2006 |
| WO | 9954804 | 10/1999 |
| WO | 0116759 | 3/2001 |
| WO | 0233866 | 4/2002 |
| WO | 02063576 | 8/2002 |
| WO | 2004029860 | 4/2004 |

OTHER PUBLICATIONS

International Standard ISO/IEC 7816-4:1995 (first edition).

International Standard ISO/IEC 7816-4:2005 (available for purchase at http://www.iso. org/iso/en/CatalogueDetailPage. CatalogueDetail?CSNUMBER=36134&ICS1=35&ICS2=240 &ICS3=15).

International Preliminary Search Report on Patentability dated Jan. 29, 2009, International Patent Application No. PCT/CA2007/ 000437.

Co-pending U.S. Appl. No. 11/622,250, "Method, System and Smart Card Reader for Management of Access to a Smart Card", filed Jan. 11, 2007.

United States Office Action dated Nov. 13, 2008, U.S. Appl. No. 11/622,250.

Office Action Response dated Feb. 13, 2009, U.S. Appl. No. 11/622,250.

United States Office Action dated May 27, 2009, U.S. Appl. No. 11/622,250.

Office Action Response dated Aug. 27, 2009, U.S. Appl. No. 11/622,250.

Research in Motion Limited, "Blackberry Smart Card Reader Security", Release 1.0, White Paper, 2005, p. 1-16.

Maier, "Authentication and Paring in Limited Mobile Environments", INET, [Online] Mar. 17, 2004, XP002396358, URL: "http:// www.esat.kuleuven.ac.be/cosic/seminars/slides/seminar-2004-03-17.pdf", [retrieved on Aug. 24, 2006], p. 2-11.

European Search Report dated Oct. 26, 2009, European Patent Application No. 07701666.5.

European Search Report dated Oct. 26, 2009, European Patent Application No. 07710765.4.

European Search Report dated Nov. 11, 2009, European Patent Application No. 07701666.5.

United States Final Office Action dated Dec. 11, 2009, U.S. Appl. No. 11/622,250.

Co-pending U.S. Appl. No. 12/335,212, "System and Method for Managing Multiple Smart Card Sessions", filed Dec. 15, 2008.

United States Office Action dated Oct. 19, 2009, U.S. Appl. No. 12/335,212.

Co-pending U.S. Appl. No. 11/412,759, "System and Method for Managing Multiple Smart Card Sessions", filed Apr. 28, 2006, issued to patent as U.S. Patent No. 7,464,865.

United States Office Action Response dated May 11, 2010, U.S. Appl. No. 11/622,250.

United States Office Action Response dated Jan. 19, 2010, U.S. Appl. No. 12/335,212.

United States Office Action dated Mar. 29, 2010, U.S. Appl. No. 12/335,212.

United States Notice of Allowance, U.S. Appl. No. 11/622,250, dated Sep. 3, 2010.

United States Notice of Allowance, U.S. Appl. No. 11/687,331, dated Mar. 5, 2010.

United States Office Action, U.S. Appl. No. 13/007,868, dated Mar. 2, 2011.

United States Notice of Allowance, U.S. Appl. No. 12/335,212, dated Oct. 18, 2010.

European Notice of Intent to Grant, European Patent Application No. 07710765.4, dated Jun. 14, 2010.

European Notice of Intent to Grant, European Patent Application No. 07701666.5, dated Oct. 29, 2010.

Chinese Office Action, Chinese Patent Application No. 200780034636.6, dated Sep. 30, 2010.

Co-pending U.S. Appl. No. 13/007,868 entitled "Method, System and Smart Card Reader for Management of Access to a Smart Card", filed Jan. 17, 2011.

European Search and Examination Report, European Patent Application No. 11161043.2, dated May 26, 2011.

Canadian Office Action, Canadian Patent Application No. 2,658,422 dated Jul. 11, 2011.

Canadian Office Action, Canadian Patent Application No. 2,658,419 dated Jul. 8, 2011.

United States Office Action Response, U.S. Appl. No. 13/007,868 dated Jul. 4, 2011.

United States Notice of Allowance, U.S. Appl. No. 13/007,868 dated Aug. 18, 2011.

Chinese Notification of Grant, Chinese Patent Application No. 200780034636, dated May 26, 2011.

METHOD, SYSTEM AND SMART CARD READER FOR MANAGEMENT OF ACCESS TO A SMART CARD

CROSS-REFERENCE TO RELATED APPLICATIONS

This application is a continuation of U.S. patent application Ser. No. 11/687,331, filed Mar. 16, 2007, issued as U.S. Pat. No. 7,766,243, which is a continuation-in-part of U.S. patent application Ser. No. 11/622,250, filed Jan. 11, 2007, now U.S. Pat. No. 7,781,010 which claims the benefit of U.S. Provisional Patent Application No. 60/807,743, filed Jul. 19, 2006. The entirety of U.S. Patent Application No. 60/807,743, U.S. patent application Ser. No. 11/622,250, and U.S. patent application Ser. No. 11/687,331 are hereby incorporated by reference.

TECHNICAL FIELD

The described embodiments relate to methods, systems and card reader devices for management of access to a smart card. In particular, the described embodiments relate to facilitating access to the smart card by multiple devices.

BACKGROUND

Communication with a smart card requires a session to be opened between the smart card and the application that wishes to communicate with it. The secure nature of a smart card requires that only one session can be open at any given time. Most smart card readers (SCR) are connected to one system at a time, which allows for its exclusive use by the attached system. Many systems take advantage of this exclusivity by maintaining an open session with the smart card for the duration of the time the smart card is inserted in the reader.

With some SCRs, it is possible (even likely) that more than one connection will exist at a given time. However, if a session is opened by one of the connected systems, it is generally not possible for another connected system to open the session for its own use until the system which currently has the open session decides to close its session.

This may be the case when both a handheld device and a Personal Computer (PC) are connected to the SCR. When the PC is notified by the SCR that a smart card has been inserted, the PC will typically open the smart card session and keep the session open until the connection with the reader is terminated or the smart card is removed from the SCR. Since the smart card session is always being held open by the PC, the handheld device cannot initiate a session with the smart card. This prevents the handheld device user from performing operations such as signing or decrypting emails, and if the smart card is required for authenticating the user for use of the handheld device, the user will not be able to unlock the handheld device.

The described embodiments attempt to address or ameliorate one or more shortcomings or disadvantages associated with existing techniques for management of access to a smart card, or to at least provide a useful alternative thereto.

BRIEF DESCRIPTION OF THE DRAWINGS

Embodiments are described in further detail below, by way of example only, with reference to the accompanying drawings, in which.

DETAILED DESCRIPTION

Figure 1:
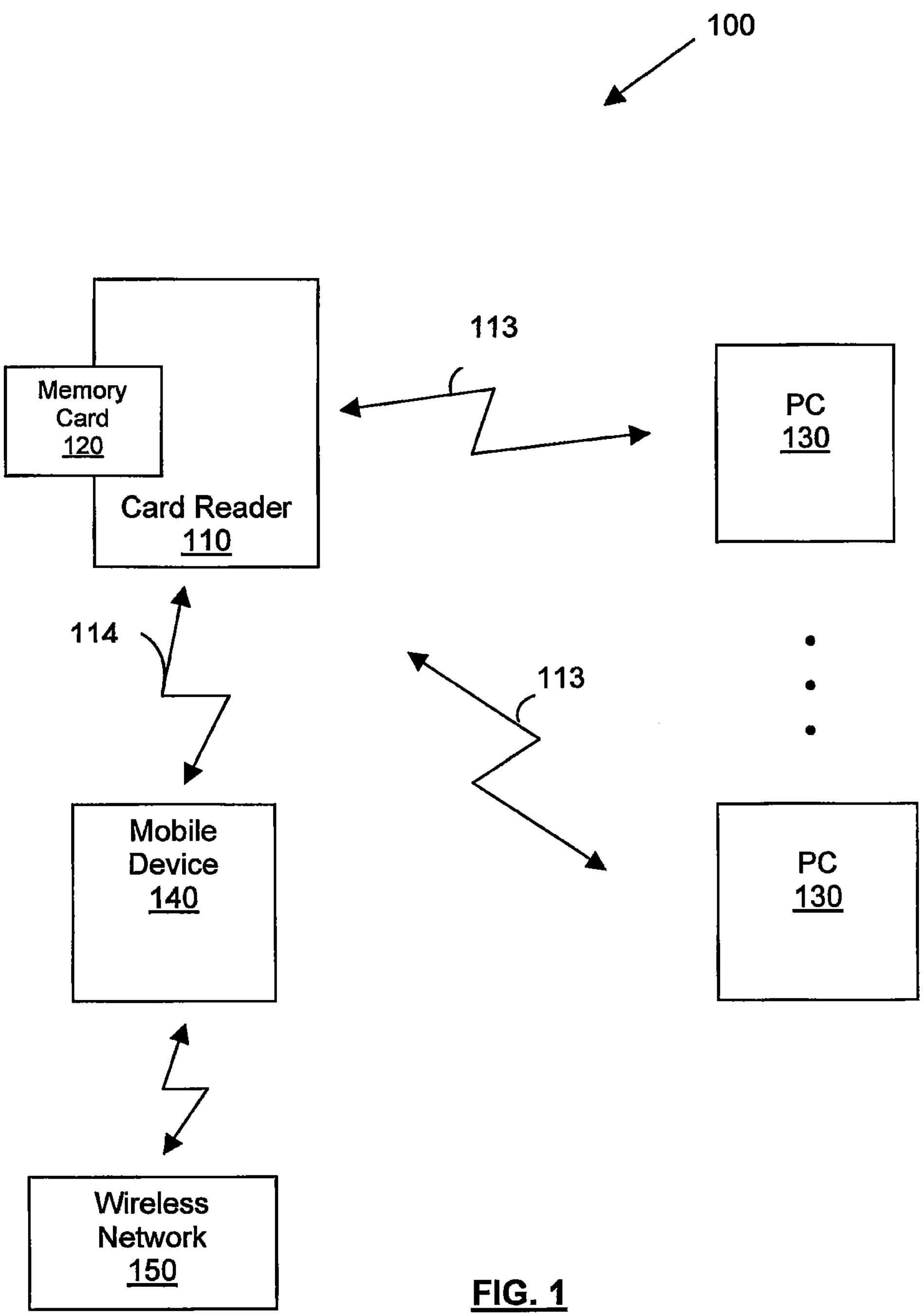
FIG. 1 is a block diagram of a system for accessing a smart card.

The described embodiments relate generally to devices, methods and systems for managing access to a memory card, such as a smart card, by a plurality of accessing devices. Further embodiments relate to computer readable storage storing computer program instructions for execution by a processor to perform the described methods.

Certain embodiments relate to a card reader device for managing access to a memory card by a plurality of accessing devices. The card reader device comprises: a processor; a wireless communication interface responsive to the processor for communicating with the plurality of accessing devices; a memory card interface for enabling communication between the processor and the memory card; wherein, when at least a first secure session is open between at least a first accessing device and the memory card and the card reader device receives an open session command from a second accessing device, the processor is configured to determine whether the memory card can support a second secure session simultaneously with at least the first secure session and, if the processor determines that the memory card cannot simultaneously support the first secure session and the second secure session, to terminate the first secure session and to allow the second accessing device to open the second secure session between the memory card and the second accessing device.

The open session command may comprise a MANAGE_CHANNEL command. The device may further comprise a memory, the memory storing a connection table, wherein the connection table comprises entries for each session established between the smart card and a respective accessing device. The connection table may comprise, for each session entry, one or more channel entries. The memory card interface may comprise a channel manager and the channel manager may be configured to determine whether multiple secure sessions can be supported by the memory card.

The processor may be configured to, prior to terminating the first secure session, determine all secure sessions established with the memory card and to provide a list of accessing devices corresponding to the all secure sessions to the second accessing device for display to a user of the second accessing device. The processor may be configured to terminate the first secure session in response to a command received from the second accessing device corresponding to a user selection of the first accessing device from the list. The memory card interface may comprise a channel manager, wherein the channel manager controls the channels that can be opened between the smart card and the plurality of accessing devices so that the total number of channels is limited to a predetermined number. The processor may be configured to terminate the first open session by notifying the first accessing device that the memory card cannot be accessed by the card reader device. The processor may be configured to terminate the first open session by notifying the first accessing device that the memory card has been removed from the card reader device.

The device may further comprise a serial interface for wired communication with one of the plurality of accessing devices. The device may further comprise a socket for receiving the smart card and electrically coupling the processor and the smart card. The memory card interface may enable wireless communication between the card reader device and the memory card.

Further embodiments relate to a method of managing communication between a memory card and a plurality of accessing devices, comprising at least first and second accessing devices, when at least a first secure session is established between the memory card and at least the first accessing device, respectively, the method comprising: receiving at a card reader device in communication with the memory card an open session command from the second accessing device to open a second secure session with the memory card; determining whether the memory card can support the second secure session with the second accessing device; terminating the first secure session between the first accessing device and the memory card in response to a determination that the memory card cannot support the second secure session; and opening the second secure session between the second accessing device and the memory card.

The open session command may comprise a MANAGE_CHANNEL command. The method may further comprise storing a connection table in a memory of the card reader device, the connection table comprising entries for each session established between the smart card and a respective accessing device. The connection table may include, for each session entry, one or more channel entries. The determining may comprise determining whether multiple secure sessions can be supported by the memory card.

The method may further comprise: prior to terminating the first secure session, determining all secure sessions established with the memory card; and providing a list of accessing devices corresponding to the all secure sessions to the second accessing device for display to a user of the second accessing device; and wherein the first secure session is terminated in response to a command received from the second accessing device corresponding to a user selection of the first accessing device from the list.

The method may further comprise controlling the channels that can be opened between the smart card and the plurality of accessing devices so that the total number of channels is limited to a predetermined number. The terminating may comprise notifying the first accessing device that the memory card cannot be accessed by the card reader device. The terminating may comprise notifying the first accessing device that the memory card has been removed from the card reader device. Computer readable storage storing program instructions which, when executed by a processor on a smart card reader, cause the processor to perform the methods as described above.

Further embodiments relate to a system for managing access to a memory card by a plurality of accessing devices. The system comprises: a card reader device having a processor, a wireless communication interface responsive to the processor for communicating with the plurality of accessing devices and a memory card interface for enabling communication between the processor and the memory card; at least a first accessing device in communication with the card reader device; and a second accessing device in communication with the card reader device; wherein, when at least a first secure session is open between the first accessing device and the memory card and the card reader device receives an open session command from the second accessing device, the processor is configured to determine whether the memory card can support a second secure session simultaneously with the at least first secure session and, if the processor determines that the memory card cannot simultaneously support the first secure session and the second secure session, to terminate the first secure session and to allow the second accessing device to open the second secure session between the memory card and the second accessing device.

The processor may be configured to terminate the first secure session in response to a command received from the second accessing device corresponding to a user selection on the second accessing device. The card reader device may further comprise a memory, the memory storing a connection table, wherein the connection table comprises entries for each session established between the smart card and a respective accessing device. The connection table may comprise, for each session entry, one or more channel entries. The memory card interface may comprise a channel manager and the channel manager is configured to determine whether multiple secure sessions can be supported by the memory card.

The processor may be configured to, prior to terminating the first secure session, determine all secure sessions established with the memory card and to provide a list of accessing devices corresponding to the all secure sessions to the second accessing device for display to a user of the second accessing device. The processor may be configured to terminate the first secure session in response to a command received from the second accessing device corresponding to a user selection of the first accessing device from the list.

The memory card interface may comprise a channel manager, wherein the channel manager controls the channels that can be opened between the smart card and the plurality of accessing devices so that the total number of channels is limited to a predetermined number. The processor may be configured to terminate the first open session by notifying the first accessing device that the memory card cannot be accessed by the card reader device. The processor may be configured to terminate the first open session by notifying the first accessing device that the memory card has been removed from the card reader device.

The system may further comprise a serial interface for wired communication with one of the plurality of accessing devices. The card reader device may comprise a socket for receiving the smart card and electrically coupling the processor and the smart card. The memory card interface may enable wireless communication between the card reader device and the memory card.

Communication with a smart card during a smart card session is processed on what is referred to as the basic channel. ISO 7816-4, Section 6.16 defines the MANAGE_CHANNEL command, which can be used to create up to three logical channels (in addition to the basic channel) on which to communicate with the smart card. Opening a new logical channel allows the commands to be processed by the smart card without affecting the session state of the basic channel or other logical channels.

In the current architecture on the Microsoft Windows™ platform, for example, the manufacturer of the smart card typically supplies a Cryptographic Service Provider (CSP) which is used by the operating system and applications on the PC to communicate with the smart card. It is the CSP that maintains the long term smart card session. The CSP manages communication with the smart card through the SCR, ensuring that responses are provided to the process that sent the associated command.

FIG. 1 depicts a system 100 for accessing a memory card 120 received by, or otherwise electronically coupled with, a card reader (SCR) 110. System 100 includes multiple computing devices in communication with card reader 110 over a wireless interface. Such computing devices include one or more wireless-enabled personal computers (PC) 130 and at least one wireless-enabled mobile device 140. Each of the computing devices has a wireless transceiver for communicating with card reader 110, which also has a wireless transceiver, over a communication link 113 or 114. Alternatively, one of the computing devices, such as the mobile device 140, may be in communication with card reader 110 via a wired connection, such as a universal serial bus (USB) cable. Either or both of PC 130 and mobile device 140 may be termed an "accessing device" in the context of the described embodiments.

When multiple connections are open between would-be accessing devices (e.g. PC 130 and mobile device 140) and the SCR 110, only one connection can have the smart card session at a given time. Since any session opened by a PC 130 is likely to be a long term session, other connections will not be able to open the session. Using an open channel command, such as the MANAGE_CHANNEL command, the SCR 110 can open a logical channel, if one is available, which can be used to send commands to the memory card 120 for processing, while not affecting the previously opened session.

In order to do this, the SCR 110 manages the use of logical channels in a manner that is transparent to the originator of the commands. This may involve, for example, modifying the Class byte (CLA) of the application protocol data unit (APDU), as defined in the ISO 7816 standard, to specify the correct logical channel. The SCR 110 also ensures that commands that affect other channels, such as a card reset command, are not allowed if received from a connection that uses a logical channel that the SCR 110 is managing.

The SCR 110 also handles receiving further MANAGE_CHANNEL commands on the basic channel or a logical channel that it is managing. This may involve opening a new logical channel either on the basic channel or on the current logical channel, depending on the channel over which the session request was received, and providing the appropriate feedback to the accessing device 130, 140 that sent the MANAGE_CHANNEL command.

In order to manage the processing of simultaneous commands from multiple accessing devices 130, 140, it may be necessary to prioritize commands coming from specific connections, or even commands themselves. This may be required to ensure that more urgent operations, such as user authentication, are not unduly delayed by commands that take longer to process, such as importing a certificate. For example, if a PC 130 is importing certificates from the memory card 120 (which is a relatively long process), and the mobile device 140 needs to authenticate the user in order to unlock the device, the authentication request from the mobile device 140 should be given a higher priority and be processed as soon as a logical channel becomes available.

By default, all commands from the mobile device 140 may be considered higher priority than commands from a PC 130, simply because smart card sessions with mobile device 140 are more likely to be short. Alternatively, commands from the mobile device 140 can be accompanied by an indication of the command type (such as User Authentication or Data Signing, for example) which would allow the SCR 110 to determine which commands should have higher priority, for example based on the number and type of connections open and the number of logical channels available.

The mobile device 140 may be any suitable wirelessly enabled handheld mobile device. The mobile device 140 may be a dual mode (data and voice) communication device and personal digital assistant device, such as is described in further detail below in relation to FIG. 2. Alternatively, the mobile device may be a single mode (data) communication device. The mobile device 140 may be capable of email communication. The user of mobile device 140 may be required to authenticate itself for use of the mobile device 140 by providing a password or a personal identification number (PIN) code, for example to unlock a user interface of mobile device 140, to digitally sign a message or to decrypt an encrypted message.

Personal computers 130 may be any kind of computer, such as a normal desktop computer, laptop or other portable or fixed computer system which may require access to memory card 120. While computing devices 130 are described as being PCs, it should be understood that they need not be of a particular type of computer, nor must they be of the same type or run a particular operating system. While not specifically shown in FIG. 1, each PC 130 is enabled for wireless and/or wired communication with card reader 110 in a manner compatible with the communication capabilities of card reader 110 described below in relation to FIG. 3.

Although FIG. 1 illustrates more than one PC 130 in communication with card reader 110 over a wireless link 113, only one such PC 130 may be present in system 100. Further, while FIG. 1 does not illustrate a communication link between mobile device 140 and PC 130, such a link may be established.

Memory card 120 may be a smart card. Smart cards are personalized security devices, defined by the ISO 7816-4 standard and its derivatives, as published by the International Organization for Standardization. A smart card may have a form factor of a credit card and may include a semiconductor device. The semiconductor device may include a memory that can be programmed with security information, for example such as a private decryption key, a private signing key, biometrics information or an authentication certificate. The semiconductor device may include a decryption engine, such as a processor and/or dedicated logic circuitry for performing decryption and/or authentication functions. The smart card may include a connector for powering the semiconductor device and performing serial communication with an external device, such as card reader 110.

Smart cards may have exposed contacts on one surface of the card for establishing electrical contact with corresponding contacts on the card reader, thereby facilitating communication between the smart card and the card reader. In one embodiment, memory card 120 and card reader 110 use electrical contact to establish communication therebetween. Although memory card 120 may be physically received in card reader 110, it is not essential that card reader 110 physically receive or contact memory card 120 in order to establish communication therebetween. For example, in some embodiments, memory card 120 may interface with card reader 110 using radio frequency identification (RFID) technology. In such embodiments, the memory card 120 need only be sufficiently proximate to card reader 110 to enable radio frequency communication therebetween.

Mobile device 140 may be enabled to communicate with a wireless network 150. The wireless network 150 may be implemented as a packet-based cellular network that includes a number of base stations, each providing wireless Radio Frequency (RF) coverage to a corresponding area or cell. For example, the wireless network 150 could conform to one or more of the following, among other network standards: Mobitex Radio Network; DataTAC; Global System for Mobile Communication (GSM); General Packet Radio System (GPRS); Time Division Multiple Access (TDMA); Code Division Multiple Access (CDMA); Cellular Digital Packet Data (CDPD); integrated Digital Enhanced Network (iDEN); or various other third generation networks such as Enhanced Data rates for GSM Evolution (EDGE) or Universal Mobile Telecommunications Systems (UMTS).

In some embodiments, instead of, or in addition to, a wireless wide area network, the wireless network 150 may include a wireless local area network, such as, for example, a wireless local area network that conforms to one or more IEEE 802.11 standards, such as 802.11b, 802.11g and 802.11n. In at least some example embodiments, the wireless network 150 is connected, through intermediate communications links (not shown), including, for example, links through the Internet, to one or more enterprise networks (not shown). Typically, such enterprise networks are each associated with a set of respective mobile devices 140, such that the mobile devices 140 are each enabled to exchange electronic messages and other information with the enterprise networks with which the mobile devices 140 are associated.

Figure 2:
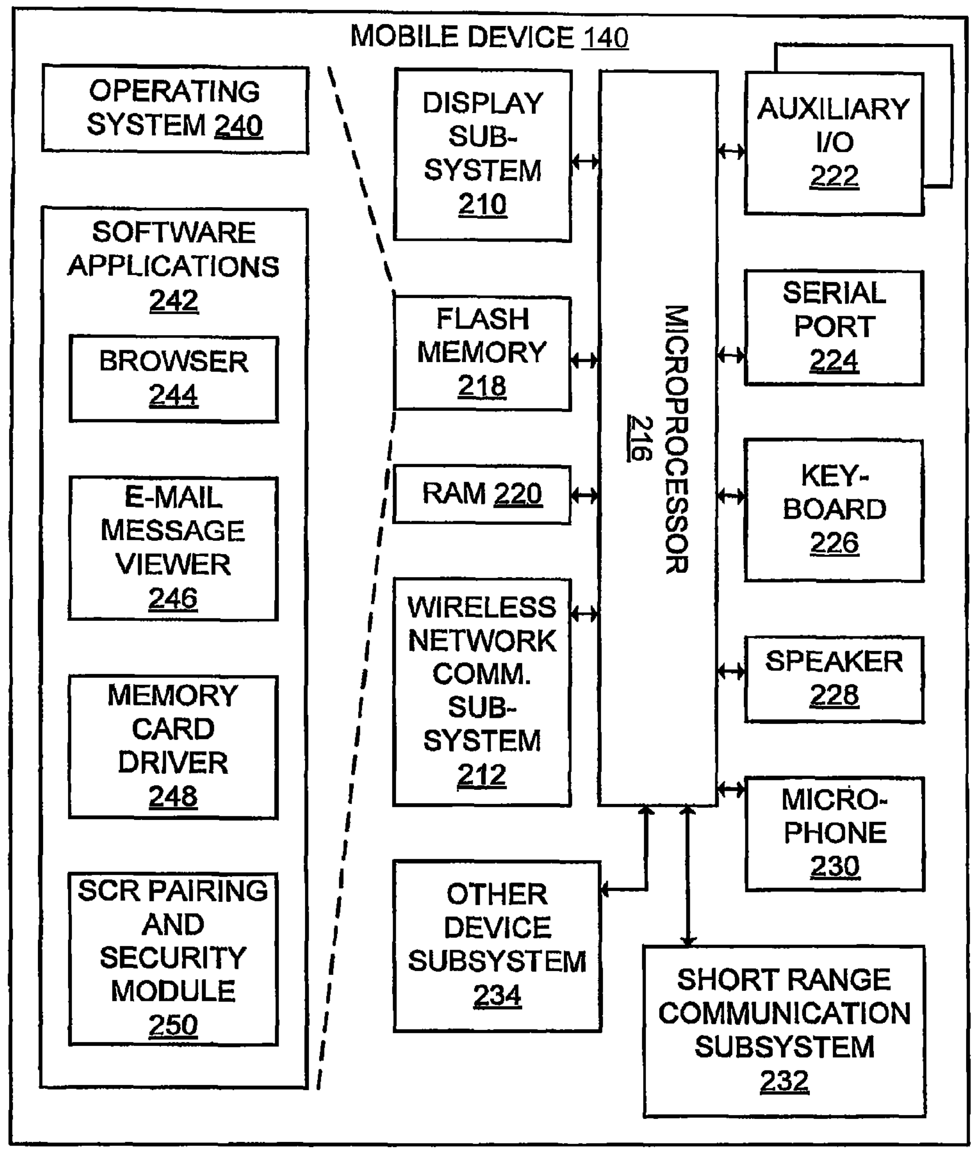
FIG. 2 is a block diagram of a smart card reader for use in the system of FIG. 1.

FIG. 2 illustrates a detailed embodiment of the mobile device 140. The mobile device 140 includes a display subsystem 210 and a wireless network communication subsystem 212 for two-way communications with the wireless network 150 (FIG. 1). According to one embodiment, the communications subsystem 212 includes antennas (not shown), RF transceivers (not shown) and some signal processing capabilities that may be implemented, for example, by a digital signal processor (not shown). The mobile device 140 also includes a controller in the form of at least one mobile device microprocessor 216 that is suitably programmed to control the overall operation and functions of the mobile device 140, which are described in more detail below.

The mobile device 140 includes peripheral devices or subsystems such as a flash memory 218, a random access memory (RAM) 220, an auxiliary input/output (I/O) subsystem 222 (e.g., a scroll wheel), a serial port 224 (e.g., a Universal Serial Bus, or "USB", port), an input device 226 (e.g., a keyboard or keypad), a speaker 228, a microphone 230, a mobile device short-range communications subsystem 232 (e.g., an infrared transceiver, wireless bus protocol system, such as a Bluetooth™ or other means of local wireless communications) and an other device subsystem designated generally by reference 234.

The mobile device microprocessor 216 operates under stored program control with code or firmware being stored in the flash memory 218 (or other type of non-volatile memory device or devices). As depicted in FIG. 2, the flash memory 218 includes stored programs (e.g., firmware) including an operating system program or code module 240 and other programs or software applications indicated generally by reference 242. The software applications 242 can, for example, include a World Wide Web (WWW) browsing application 244 and an e-mail client application 246.

According to example embodiments, the software applications 242 of the mobile device 140 further include a memory card driver 248 that may be used in conjunction with the card reader 110, which is described in more detail below in connection with FIG. 3. Notably, the memory card driver 248 may be provided, not by the manufacturer of the mobile device 140, but, instead, by a third party, i.e., the manufacturer of the memory card 120. Furthermore, an Application Programming Interface (API) may be built in to the memory card driver 248 to allow the mobile device 140 to communicate with the memory card 120 through the card reader 110.

The software applications 242 of the mobile device 140 may further include a smart card reader (SCR) pairing and security module 250 for coordinating a pairing process between the mobile device 140 and the card reader 110. The roles of the memory card driver 248 and the smart card reader pairing and security module 250 will be described in greater detail below. Software applications 242 may further comprise a channel manager (not shown) for managing communication between multiple applications on mobile device 140 that have an active session open with memory card 120 over separate logical channels.

The operating system code 240, code for specific device applications 242, code for the WWW browsing application 244, code for the e-mail client application 246, code for the memory card driver 248, or code for the smart card reader pairing and security module 250 may be temporarily loaded into a volatile storage medium such as the RAM 220 during operation of the mobile device 140. Received communication signals and other data with information may also be stored in the RAM 220. In some embodiments, the mobile device 140 may include, in addition to the internal flash memory 218, persistent memory carried on a SIM (Subscriber Identity Module) card, or other removable device, and at least some of the flash memory 218 may be allocated to the SIM card flash memory.

The stored program control (i.e., the software applications 242) for the mobile device microprocessor 216 also includes a predetermined set of applications, code components or software modules that control basic device operations, for example, data and voice communication applications which are normally installed on the mobile device 140 as the software applications 242 during the manufacturing process. Further applications may also be loaded (i.e., downloaded) onto the mobile device 140 through the operation of networks described above, the auxiliary I/O subsystem 222, the serial port 224 or the mobile device short-range communications subsystem 232. The downloaded code modules or components are then installed by the user (or automatically) in the RAM 220 or the non-volatile program memory (e.g., the flash memory 218).

The serial port 224 comprises a USB-type interface port for interfacing or synchronizing with another device, such as a desktop or notebook computer (not shown). The serial port 224 is used to set preferences through an external device or software application. The serial port 224 is also used to extend the capabilities of the mobile device 140 by providing for information or software downloads, including user interface information, to the mobile device 140 other than through a wireless communication network. In one embodiment, the serial port 224 may be used to communicate with card reader 110.

The mobile device short-range communications subsystem 232 provides an interface for communication between the mobile device 140 and other devices, including the card reader 110, to be described in greater detail in connection with FIG. 3, below. For example, the mobile device short-range communications subsystem 232 may employ an infrared communication link or channel, or may operate according to a wireless bus protocol, such as Bluetooth™, or any other localized wireless means of communication.

Figure 3:
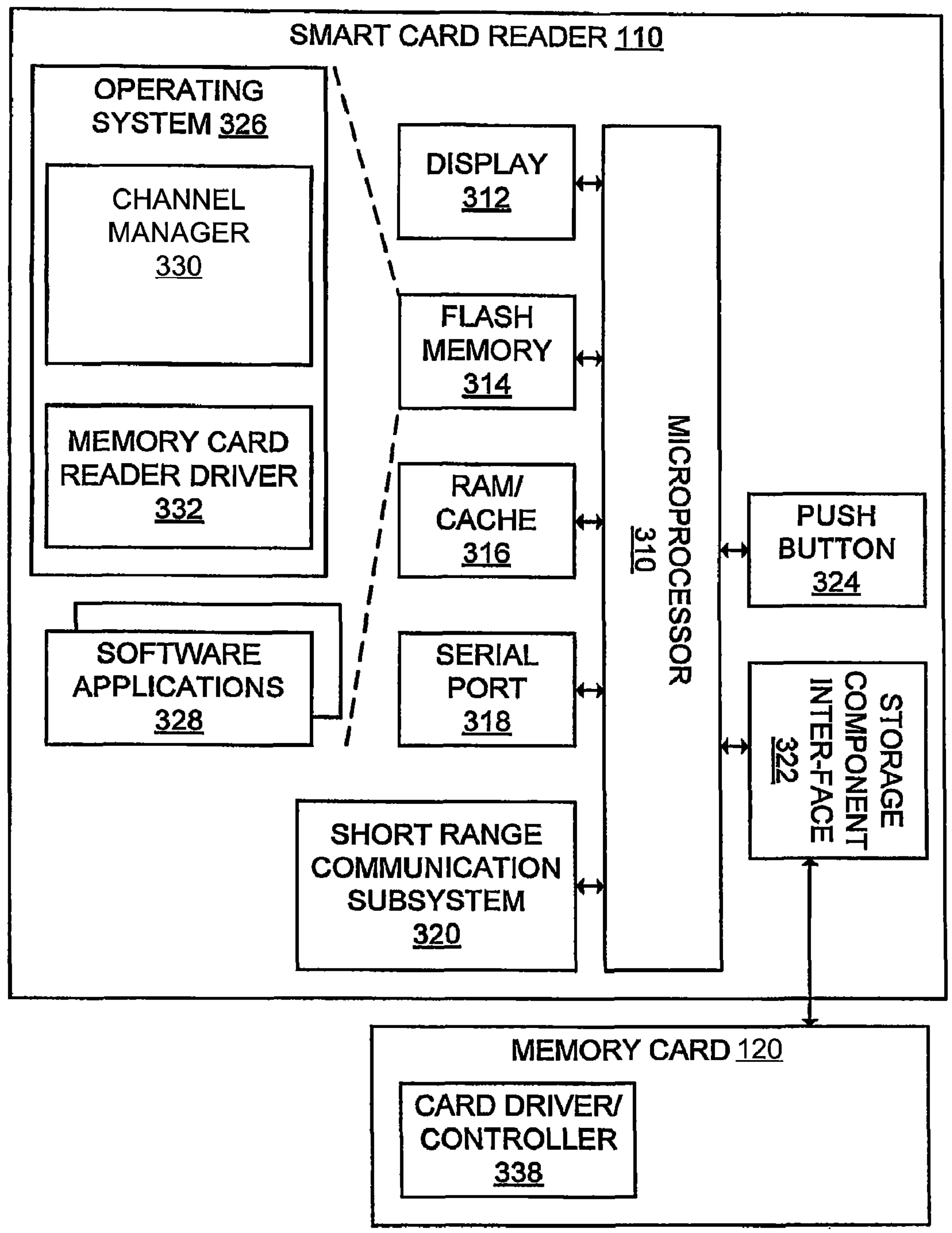
FIG. 3 is a block diagram of mobile device for use in the system of FIG. 1.

FIG. 3 illustrates an example embodiment of the card reader 110, in the exemplary form of a smart card reader. The card reader 110 includes a controller including at least one smart card reader microprocessor 310, which is suitably programmed to control the overall operation and functions of the card reader 110. The card reader 110 also includes an output device 312 (e.g., a display module). The card reader 110 further includes peripheral devices or subsystems such as a flash memory 314, a random access memory (RAM) 316, which, in some embodiments, includes a portion allocated to a data cache, a serial port 318 (e.g., a USB port), a smart card reader short-range communications subsystem 320 (e.g., an infrared transceiver or a wireless bus protocol system using a protocol such as a Bluetooth™), a storage component interface 322 (e.g., for a memory card or any other data storage device) and a pairing-activation input device 324 (e.g., a push button).

The smart card reader microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software applications indicated generally by reference 328. The operating system 326 of the card reader 110 further includes a channel manager component 330 and a memory card reader driver component 332.

The channel manager component 330 is responsible for communicating with the one or more accessing devices 130, 140 and memory card 120 to facilitate establishment and perpetuation (for as long as required) of one or more secure sessions between the one or more accessing devices 130, 140 and memory card 120. The functions of the channel manager component 330 are described in further detail below, with reference to FIGS. 5 and 9.

The memory card reader driver component 332 is responsible for coordinating communications between the card reader 110 and a memory card 120 and/or the memory card driver 248 of the mobile device 140 (via wired or wireless communication link 114).

The operating system code 326, code for specific device applications 328, code for the channel manager component 330, code for the memory card reader driver component 332, or code components thereof, may be temporarily loaded into a volatile storage medium such as the RAM 316. Received communication signals and other data may also be stored in the RAM 316. Additionally, the storage component interface 322 receives the removable memory card 120, providing additional storage space for the card reader 110.

The memory card 120 has a card driver and controller 338 responsible for coordinating communications between the memory card 120 and the memory card reader driver component 332 of the smart card reader 110. While operation of the card reader 110 is described in a context in which the memory card 120 is a smart card, it will be understood by those skilled in the art that the card reader 110 may be designed to operate with any suitable form of memory device.

The stored program control (i.e., software applications 328) for the smart card reader microprocessor 310 may include a predetermined set of applications, code components or software modules that control basic device operations, for example, management and security related control of the data of the card reader 110, and may be installed on the card reader 110 as a component of the software applications 328 during the manufacturing process. Further applications may also be loaded (i.e., downloaded) onto the card reader 110 through the operation of the serial port 318, the smart card reader short-range communications subsystem 320 or from the memory card 120. The downloaded code module or components are then installed by the user (or automatically) in the RAM 316 or non-volatile program memory (e.g., the flash memory 314).

While the channel manager component 330 and the memory card reader driver component 332 are shown to be an integrated portion of the operating system 326 for security purposes (e.g., individuals must not be permitted to tamper with the channel manager component 330 or the memory card reader driver component 332), the channel manager component 330 and/or the memory card reader driver component 332 could be installed as one of the software applications 328, provided that suitable security related precautions are taken to ensure that the channel manager component 330 and the memory card reader driver component 332 cannot be modified or tampered with by unauthorized users.

The serial port 318 may be a USB-type interface port for interfacing or synchronizing with another device, such as personal computer 130 or the mobile device 140. The serial port 318 is used to set preferences through an external device or software application or exchange data with a device, such as the mobile device 140, which data is stored on the memory card 120 that is plugged into the storage component interface 322 of the card reader 110. The serial port 318 is also used to extend the capabilities of the card reader 110 by providing for downloads to the card reader 110 of information or software, including user interface information.

The short-range communications subsystem 320 provides an interface for communication between the mobile device 140 or PC 130 and the card reader 110. In some embodiments, the short-range communications subsystem 320 employs an infrared communication link or channel. In other embodiments, the short-range communications subsystem 320 operates according to a wireless RF bus protocol, such as Bluetooth™. However, the short-range communications subsystem 320 may operate according to any suitable local wired or wireless communication protocol, provided that the short-range communications subsystem 232 (FIG. 2) of the mobile device 140 operates using the same protocol, thereby facilitating wireless communication between the mobile device 140 and the card reader 110.

Any communications mechanism and/or protocol may be implemented for the short-range communications subsystems 232, 320, provided that the mobile device 140 and the card reader 110 can communicate with each other when within sufficiently close physical proximity.

Although not shown in FIG. 1 in relation to PC 130, PC 130 comprises a suitable short-range communication subsystem for facilitating wireless communication between PC 130 and card reader 110. The short-range communication subsystem of the PC 130 may operate in a similar manner to the short-range communication subsystem 232 of the mobile device 140, for example using an infrared communication link or a wireless RF bus protocol such as Bluetooth™. Alternatively, the PC 130 may employ a suitable serial interface for communication with card reader 110, for example using a USB cable.

Figure 4:
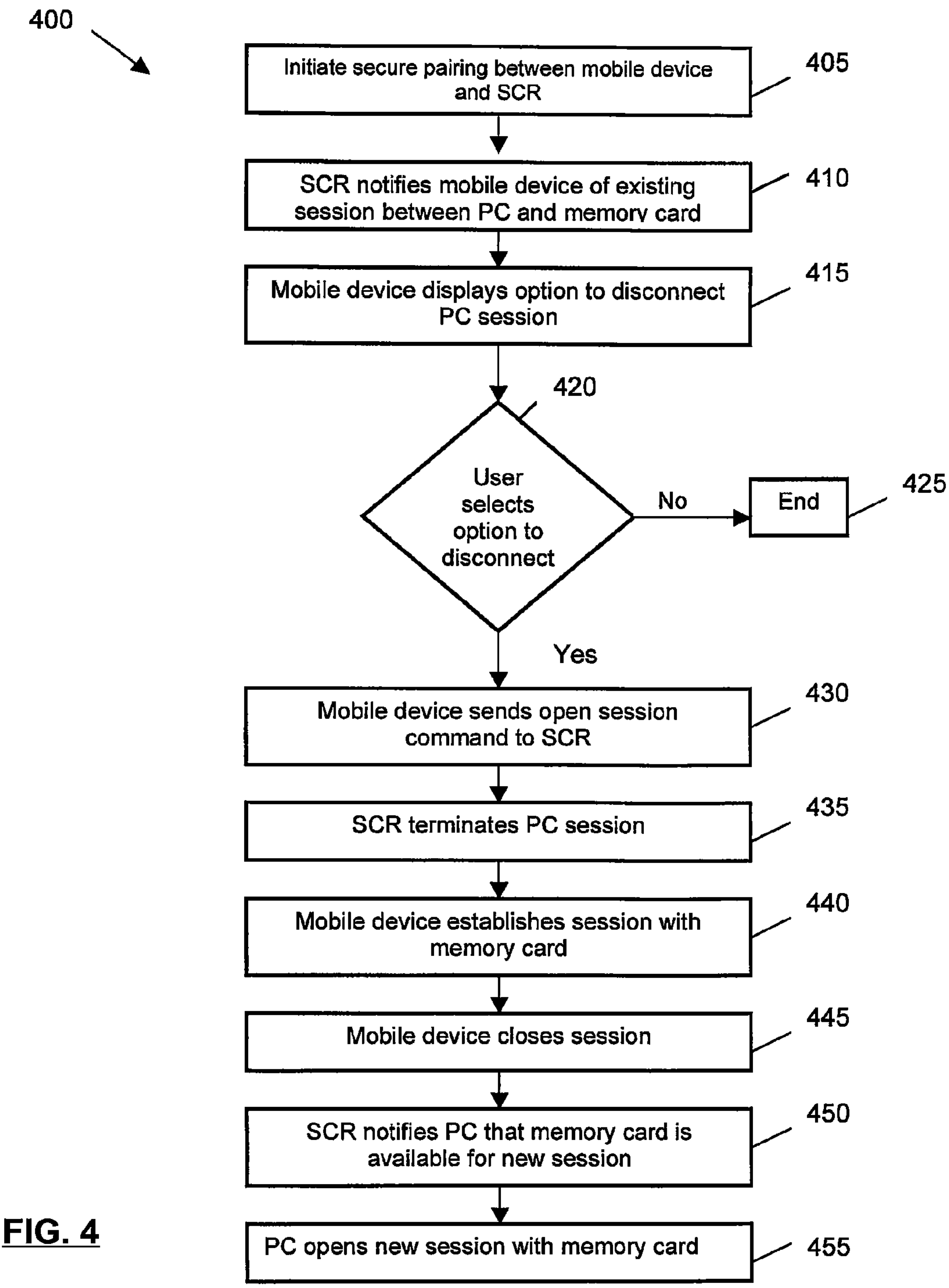
FIG. 4 is a flowchart of a method of managing access to a smart card.

Referring now to FIG. 4, there is shown a flowchart of a first method 400 for managing communication between memory card 120 and a plurality of accessing devices, such as at least one PC 130 and at least one mobile device 140. Method 400 assumes that a connection exists between a first accessing device (e.g. PC 130) and card reader 110 and that the first accessing device has established a secure session with memory card 120 via card reader 110. Method 400 also assumes that a second accessing device (e.g. mobile device

140) is introduced to system 100 subsequent to the first accessing device establishing the secure session with memory card 120.

For purposes of illustration, PC 130 will be used as an example of the first accessing device and mobile device 140 will be used as an example of the second accessing device in the following description. However, it should be understood that the PC 130 or mobile device 140 may be substituted with another form of accessing device. Further, the first accessing device may be a mobile device 140 instead of PC 130 and the second accessing device may be a PC 130 instead of mobile device 140.

At step 405, mobile device 140 and card reader 110 initiate securing pairing therebetween. Secure pairing of the mobile device 140 and card reader 110 involves setting up encryption and decryption keys for use in communicating with each other and then forming the connection for secure communication. The secure pairing of mobile device 140 and card reader 110 may be performed such that they each generate a cryptographic key for encrypting communications between mobile device 140 and card reader 110. Each such cryptographic key may be formed from separately generated symmetric keys K1, K2 and a hash result created by hashing packets communicated over communication link 114. Once each cryptographic key is generated, the mobile device 140 and card reader 110 become securely paired and the cryptographic key can be used for encrypted communication therebetween.

At step 410, the card reader 110 notifies mobile device 140 of the existing session between PC 130 and memory card 120. This notification may be passive or active. If the notification is active, the card reader may proactively indicate to the mobile device that memory card 120 is already engaged in a session or if the notification is passive, the card reader 110 may respond to a power-up command from the mobile device 140 to memory card 120 by indicating that a session has already been established.

Steps 405 and 410 may be omitted where mobile device 140 is not newly introduced to system 100 and already has information that memory card 120 is engaged in a session with another device.

At step 415, once mobile device 140 determines that there is a functional requirement to open a session with memory card 120, mobile device 140 displays an option, for example via a dialog box displayed to the user by display subsystem 210. The option thus displayed to the user is to disconnect the device currently having the open session with memory card 120 (which in this case is the PC 130) and therefore terminate the open session. An option to "cancel" and not terminate the open session may also be displayed.

At step 420, the user selects one of the options displayed at step 415, for example by providing input to keyboard 226 or to auxiliary I/O 222 (e.g. using a scroll wheel or a track ball). If the user selects the "cancel" option, method 400 ends at step 425. If the user selects the option to disconnect the existing session with PC 130, mobile device 140 transmits an open session command to card reader 110 over link 114, at step 430.

At step 435, the card reader 110 receives the open session command from mobile device 140 and is configured to recognize that the command requires the existing session to be closed in order for the mobile device 140 to open another session with memory card 120. Accordingly, the card reader 110 effectively terminates the session between PC 130 and memory card 120. This termination may be performed by notifying the PC 130 that memory card 120 can no longer be accessed by card reader 110. This may comprise simulating that memory card 120 has removed from card reader 110 or the connection between memory card 120 and card reader 110 is otherwise broken or interrupted. Upon receipt of such a notification from card reader 110, PC 130 treats the session as having been ended.

Termination of a session between PC 130 and memory card 120 may be made immediately, so as to interrupt any data exchange, or may be made subsequent to completion of a data transfer or other operation.

At step 440, mobile device 140 establishes a session with memory card 120 via card reader 110. Mobile device 140 may wait for confirmation from card reader 110 that the previous session was terminated or it may not wait for such confirmation and simply assume that termination has occurred.

At step 445, mobile device 140 transmits a close session command to card reader 110, once mobile device 140 has completed the operation for which it required the session with memory card 120 to be opened. Card reader 110 then terminates the session between memory card 120 and mobile device 140.

At step 450, card reader 110 may notify PC 130 that memory card 120 is again available for opening a new session. As it is common for a PC to maintain an open session with memory card 120 as long as communication between card reader 110 and PC 130 is established, the PC 130 will usually open a new session with memory card 120, at step 455.

As mobile device 140 is recognized by card reader 110 as being a device requiring relatively short sessions with memory card 120, in contrast with the long sessions opened by PC 130, card reader 110 may be programmed to recognize the open session command from mobile device 140 as being a command taking priority over the existing session between the memory card 120 and the PC 130. Additionally, one or more other computing devices may be recognized as having a relatively higher priority for creating a session with memory card 120, so that a relatively lower priority device can have a session open, subject to the needs of the higher priority devices.

Method 400 described in relation to FIG. 4 comprises one example of a method for managing access to a smart card by multiple accessing devices. Method 400 represents what is, in effect, a brute force method, in which the pre-existing session between PC 130 and memory card 120 is terminated in order to allow a shorter, higher priority session to be established between the mobile device 140 and smart card 120. In contrast, an alternative method of managing access to memory card 120 is described below, in relation to FIG. 5. This alternative method involves the creation of additional logical channels (on top of the basic channel) over which the newly introduced accessing device (e.g. mobile device 140) can communicate with memory card 120. The creation of such an additional logical channel is facilitated by channel manager component 330 on card reader 110.

The channel manager component 330 maintains a connection table in flash memory 314 or RAM/cache 316, with entries in the table for each connection (which may be a securely paired connection) established between the memory card 120 and a respective accessing device 130, 140. The connection table may also comprise entries for securely paired connections between card reader 110 and accessing device 130, 140 where no session is currently established with memory card 120 for that accessing device 130, 140.

For each connection entry in the connection table, there may be one or more channel entries. For example, where PC 130 has a session established with memory card 120 by the CSP over the basic channel, the connection table will have a connection entry for PC 130 and a channel entry for the basic channel associated with that session. If PC 130 opens a logical channel with memory card 120, for example where a further application on PC 130 needs to access memory card 120, then a further channel entry will be created in the connection table associated with the connection for PC 130. Additionally, the number of the logical channel is recorded in the connection table. In this example, the basic channel is number 0 and the new logical channel may be channel 1.

Building on the above example, suppose mobile device 140 establishes a securely paired connection with card reader 110 and attempts to establish a session with memory card 120. In this case, the channel manager component 330 will issue a MANAGE_CHANNEL command to memory card 120, which will then create a new logical channel over which mobile device 140 can securely communicate with memory card 120. The newly established connection between mobile device 140 and card reader 110 is recorded in the connection table, together with the logical channel assigned to the session between mobile device 140 and memory card 120.

As the establishment of the logical channel is transparent to mobile device 140 (because card reader 110 does not make mobile device 140 aware of the pre-existing session that PC 130 has established with memory card 120 over the basic channel), mobile device 140 attempts to communicate with memory card 120 over the basic channel. Thus, the APDUs transmitted from mobile device 140 to memory card 120 (via card reader 110) are modified by channel manager component 330 so as to appear to have been transmitted on the assigned logical channel for the session with mobile device 140. This may be done by modifying the class byte of each APDU from mobile device 140 so as to change the channel identifier in that byte, for example from 0 (the basic channel) to 2 (the assigned logical channel). The connection table is used by channel manager component 330 to ensure appropriate modification of the class bytes so that they appear to have been received over the assigned logical channel.

If another application on mobile device 140 then seeks to communicate with memory card 120, the channel manager on mobile device 140 may then send a further session request to card reader 110. Card reader 110 then transmits a further MANAGE_CHANNEL command to memory card 120 to open a further logical channel. Memory card 120, in this example, will assign the fourth (and last available) channel, which is channel number 3, to the new session with the further application on mobile device 140. Memory card 120 notifies card reader 110 that channel 3 has been assigned for the new session established with mobile device 140, and card reader 110 in turn notifies mobile device 140 of this assignment.

The assignment of the new logical channel for the application on mobile device 140 is not transparent to mobile device 140 because the channel manager of mobile device 140 is already aware of the session established over channel 2, which it assumes is the basic channel (channel 0). Thus, the channel manager of mobile device 140 is expecting to receive a logical channel assignment for the second session that it has sought to establish with memory card 120.

Under the above-described scenario, the connection table would have two connection entries, one for PC 130 and one for mobile device 140. The connection entry for PC 130 would indicate that channels 0 and 1 are assigned to the connection with PC 130, while the connection entry for mobile device 140 would indicate that channels 2 and 3 are assigned to mobile device 140. Channel manager component 330 also includes a mapping reference for each assigned channel in order to indicate how the incoming APDUs need to be modified. For example, when mobile device 140 transmits APDUs over what it assumes is the basic channel, a mapping of channel 0 to channel 2 is performed by channel manager component 330 in card reader 110 according to the relevant channel entry in the connection table. Table 1 below is an example connection table, depicting the recorded connection and channel entries (plus mapping, if relevant) for the above-described example.

TABLE 1

Connection Table

| Connection | Channel |
|---|---|
| PC 130 | 0 |
| | 1 |
| Mobile Device 140 | 2 (map 0 to 2) |
| | 3 |

Figure 5:
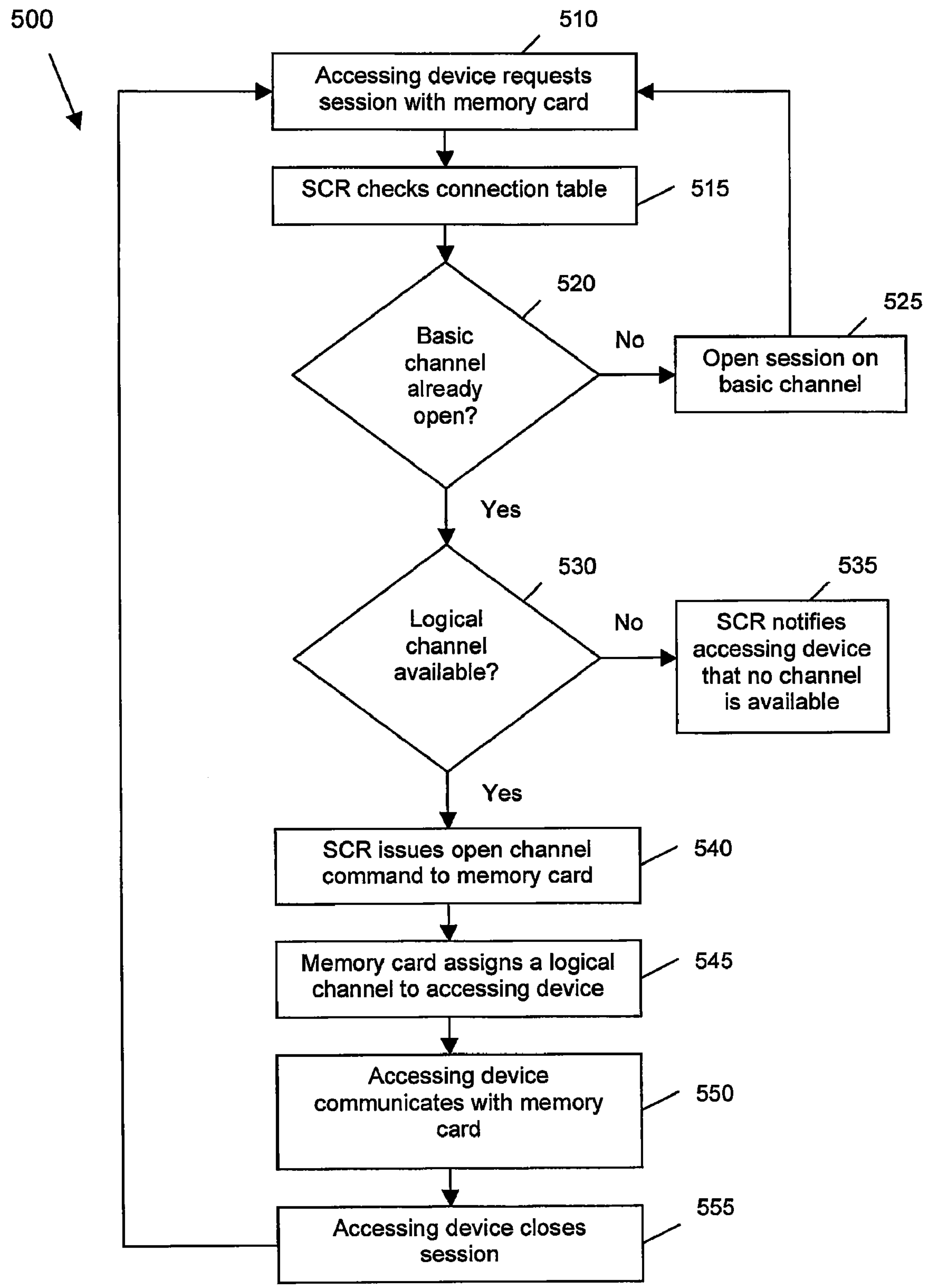
FIG. 5 is a flowchart of a further method of managing access to a smart card.

Referring now to FIG. 5, a method 500 of managing access to memory card 120 is described in further detail. Method 500 begins at step 510, at which an accessing device, for example either PC 130 or mobile device 140, requests a session with memory card 120. This session request may be in the form of a cold reset or a warm reset, depending on whether memory card 120 is in a powered-down or powered-up state, respectively.

The channel manager component 330 of SCR 110 receives the session request and, at step 515, checks the connection table stored in flash memory 314 or RAM/cache 316 to determine which channels, if any, are available to establish a session with memory card 120. If, at step 520, channel manager component 330 determines that the basic channel is not in use, then at step 525, channel manager component 330 causes memory card 120 to open a session with accessing device 130 or 140 on the basic channel and updates the connection table accordingly.

If, at step 520, channel manager component 330 determines that the basic channel is already in use, then at step 530, channel manager component 330 determines from the connection table whether a logical channel is available for the requested session. If no logical channel is available, for example because the maximum number of possible logical channels are already in use, SCR 110 may notify the accessing device 130 or 140 at step 535 that no channel is available. Alternatively, the SCR 110 may provide a list of all accessing devices connected to memory card 120 and having a secure session therewith to enable user-selection of one such secure session for termination, as described below with reference to FIGS. 7 to 10.

If, at step 530, it is determined that a logical channel is available for the requested session, SCR 110 issues an open channel command, such as a MANAGE_CHANNEL command, to memory card 120, at step 540. Memory card 120 then assigns a logical channel to the accessing device 130 or 140 requesting the new session, at step 545. If the session request was made over a pre-existing logical channel, the assigned logical channel is communicated to SCR 110 from memory card 120, and then in turn to accessing device 130 or 140. Otherwise, the assigned channel number is not communicated to the accessing device 130 or 140 as the accessing device 130 or 140 assumes that it is communicating with the memory card 120 over the basic channel.

At step 550, the accessing device 130 or 140 proceeds to communicate with memory card 120 in order to achieve its desired purpose, such as authentication or data signing. Such communication will usually include transmission of one or more APDUs according to the ISO 7816-4 standard.

If the channel assigned to the session requested by the accessing device 130 or 140 is different from the channel that the accessing device 130 or 140 assumes it has been assigned, then mapping of the assumed channel to the assigned channel is required. This is described in further detail below, with reference to FIG. 6.

Once accessing device 130 or 140 has communicated with memory card 120 to achieve its desired purpose, then at step 555, the accessing device 130 or 140 may close the session with memory card 120. This may be done by issuing an appropriate command to SCR 110, which in turn issues an appropriate end session command to memory card 120, indicating the channel on which the session was opened. Memory card 120 then closes the session for that channel and channel manager component 330 updates the connection table to remove the channel entry corresponding to the closed channel from the relevant connection entry. This close function explicitly closes a logical channel other than the basic channel. The closed logical channel is then available for reuse.

If the channel sought to be closed is the basic channel, this may necessitate closing of the logical channels also. In this case, the channel manager component 330 may facilitate re-establishment of the sessions that were open on the logical channels and that were forced to close. For example, one of the previously open sessions on a logical channel may be re-opened on the basic channel and the other sessions may be re-opened on newly re-established logical channels, based on the connections and channels recorded in the connection table.

Method 500 may be performed repeatedly over time, according to the access needs of the various accessing devices that establish connections with SCR 110. Such repeated performance need not necessarily include step 555 unless memory card 120 has reached its maximum number of logical channel assignments.

Figure 6:
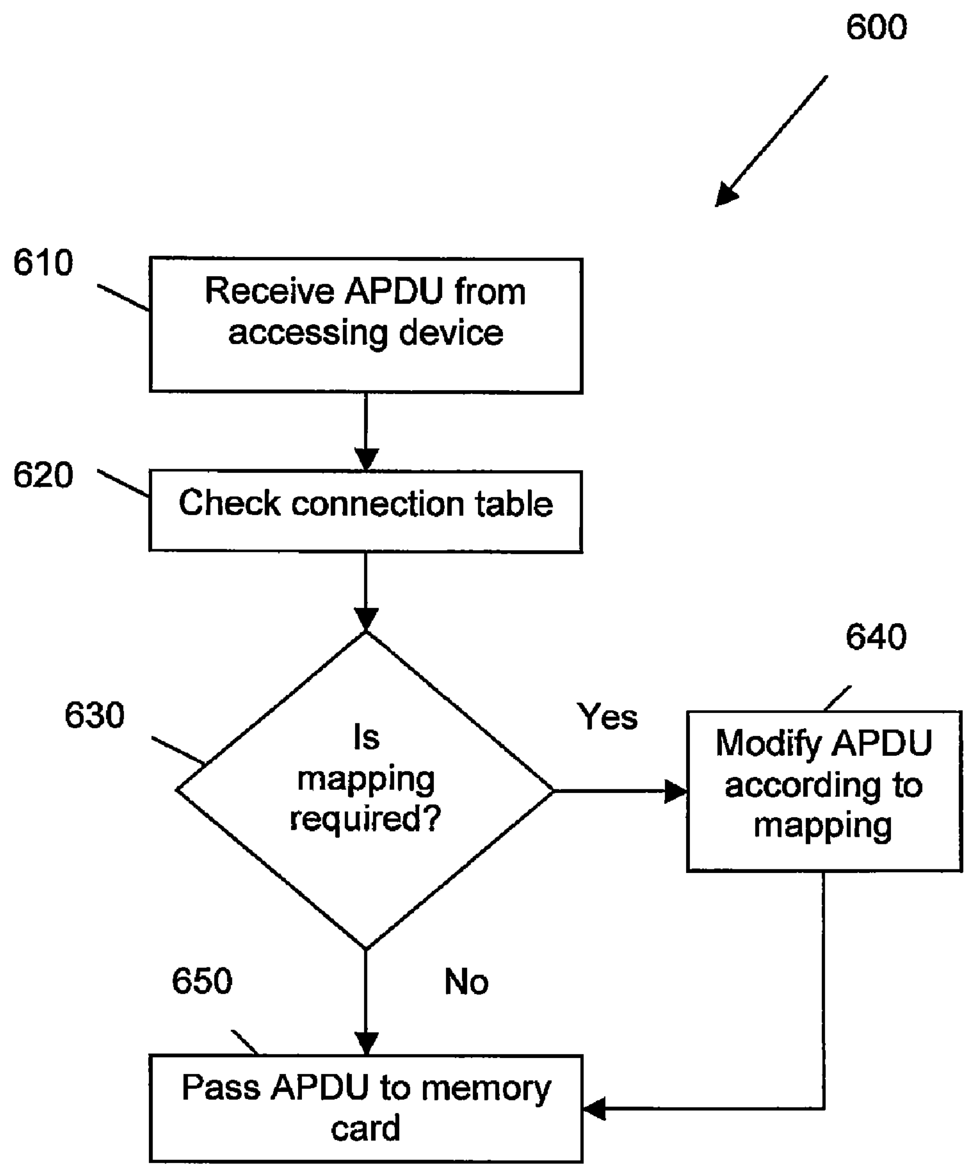
FIG. 6 is a flowchart of a method of mapping an assumed channel to an assigned channel.

Referring now to FIG. 6, a method 600 of mapping an assumed channel to an assigned channel is described in further detail. Method 600 assumes that a session between an accessing device 130 or 140 and memory card 120 has been established.

Method 600 begins at step 610, at which SCR 110 receives an APDU from accessing device 130 or 140. Channel manager component 330 determines the connection over which the APDU was received and the channel over which the APDU was intended by accessing device 130 or 140 to be provided to memory card 120. The channel manager component 330 determines the intended channel number by inspecting the relevant bits in the class byte of the APDU. The channel manager component 330 then checks the connection table at step 620 and compares the intended channel with the assigned channel.

The channel manager component 330 determines whether any mapping of the channel number is required, at step 630. If the intended channel is the same as the assigned channel, then the intended channel is correct and no mapping is required. If the intended channel is different from the assigned channel, then it is considered to be an assumed channel and must be mapped to the assigned channel according to a mapping previously determined by the channel manager component 330 and recorded in the connection table.

If the channel of the APDU is required to be mapped from an assumed channel to an assigned channel, then at step 640 the channel manager component 330 modifies the relevant bits in the class byte of the APDU according to the mapping specified in the connection table.

At step 650, if no channel mapping is required or if the APDU has been modified according to the required mapping, the APDU is then passed to memory card 120 for processing. For responses from the memory card 120 that are sent back to the accessing device 130 or 140, an inverse mapping process may be employed, as necessary.

Figure 7:
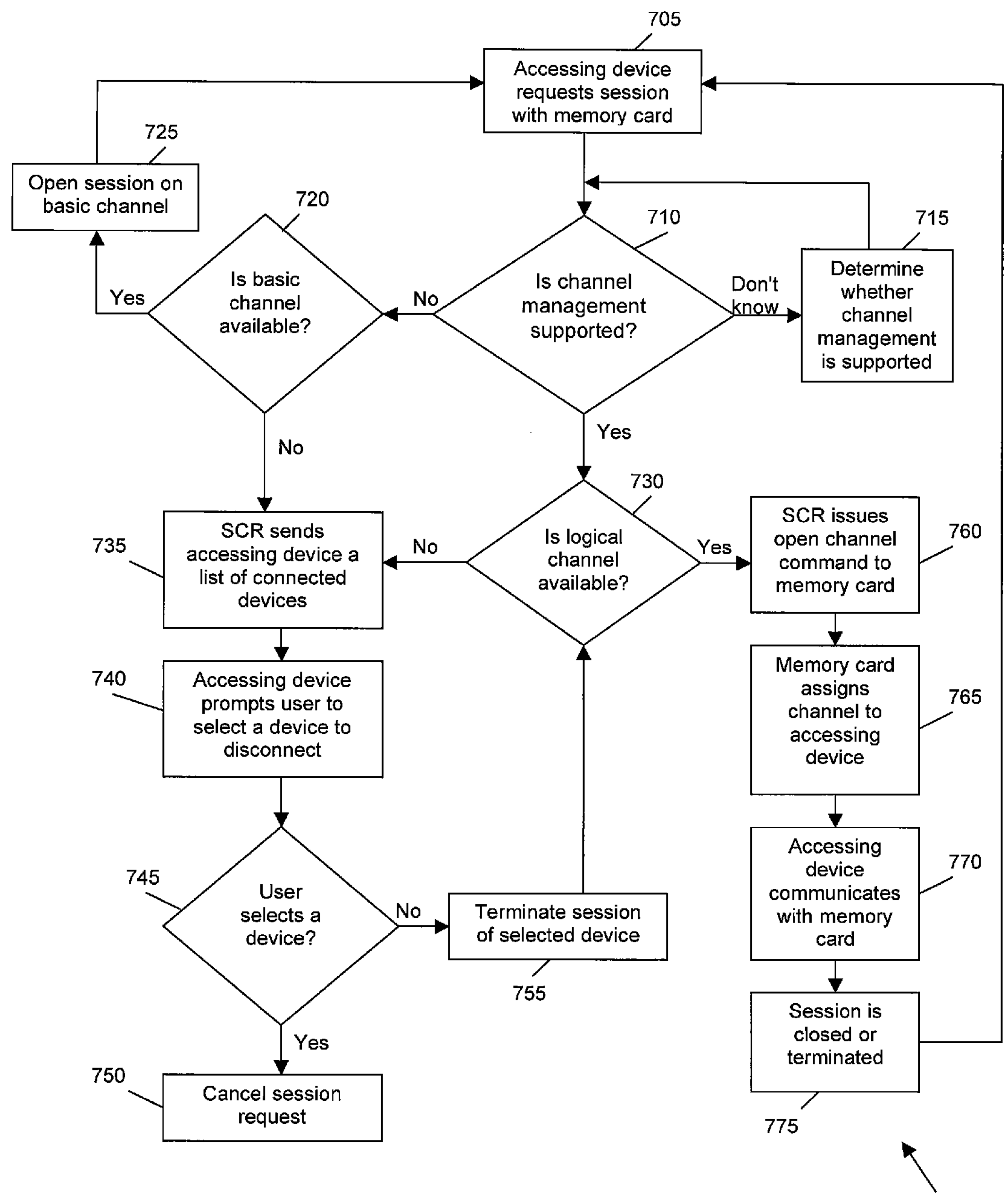
FIG. 7 is a flowchart of a further method of managing access to a smart card.

Referring now to FIG. 7, a further method 700 of managing access to memory card 120 by multiple accessing devices 130, 140 is described. Method 700 assumes that a connection exists between a first accessing device (e.g. PC 130) and card reader 110 and that the first accessing device has established a secure session with memory card 120 via card reader 110. Depending on whether memory card 120 supports creation of logical channels in addition to the basic channel, further secure sessions may be established between the memory card 120 and the first accessing device (for example, where more than one application on the first accessing device requests a secure session) or with other accessing devices. Method 700 also assumes that a second accessing device (e.g. mobile device 140) is introduced to system 100 subsequent to the first accessing device establishing the secure session with memory card 120.

For purposes of illustration, PC 130 will be used as an example of the first accessing device and mobile device 140 will be used as an example of the second accessing device in the following description. However, it should be understood that the PC 130 or mobile device 140 may be substituted with another form of accessing device. Further, the first accessing device may be a mobile device 140 instead of PC 130 and the second accessing device may be a PC 130 instead of mobile device 140.

Method 700 also assumes that secure pairing has been initiated between mobile device 140 and card reader 110, in the manner described above in relation to step 405. Method 700 begins at step 705, at which mobile device 140, as one example of the second accessing device, requests a session with memory card 120. This session request may be in the form of a cold reset or a warm reset, depending on whether the memory card 120 is in a powered-down or powered-up state, respectively. The session request may be any form of communication from the accessing device to the card reader 110 that indicates that the accessing device may wish to establish a secure session with memory card 120, regardless of whether such communication is in the form of an explicit session request. For example, the communication may be of a form such as to imply a session request, such as by requesting memory card 120 to provide its Answer To Reset (ATR) or by transmitting a command APDU to memory card 120.

Following receipt of the express or implied session request at step 705, channel manager component 330 checks, at step 710, whether channel management (i.e. support for multiple logical channels in addition to the basic channel) is supported by the memory card 120. Channel manager component 330 does this by checking a stored Boolean channel management value indicative of whether channel management is supported or not. If no such channel management value is stored, then channel manager component 330 executes a sub-process at step 715 to determine whether channel management is supported. This sub-process is described in further detail below in relation to FIG. 8.

If the channel management value indicates at step 710 that channel management is not supported, then, at step 720, channel manager component 330 checks whether the basic channel is available. If the basic channel is available, for example where the first accessing device has just ended its session, then at step 725, the second accessing device is allowed to open a secure session on the basic channel.

If the channel management value indicates that channel management is supported, then at step 730 channel management component 330 checks the connection table to determine whether a logical channel is available. If no logical channel is available, then at step 735, the channel manager component 330 sends the second accessing device a list of connected devices that have a secure session established with memory card 120. This list is generated based on the connection entries in the connection table for which there is also a session entry. Step 735 may alternatively be performed if, at step 720, channel manager component 330 determines that the basic channel is not available. The list sent to the second accessing device at step 735 may contain only a single device, for example where a single device has monopolized all (single or multiple) sessions allowed by memory card 120.

In response to receipt of the list transmitted by card reader 110 at step 735, the second accessing device (mobile device 140) provides a display window 1000 to the user on display subsystem 210 that contains the list of the connected devices. An example of such a display window 1000 is shown and described in further detail in relation to FIG. 10. At step 740, display window 1000 provides a prompt to the user to select one of the listed devices for disconnection or to cancel the session request.

At step 745, channel manager component 330 waits for receipt of a command from the mobile device 140 corresponding to selection of one of the listed devices to be disconnected. If the user elects to "cancel", mobile device 140 cancels the issued session request at step 750 by simulating a condition in which the memory card 120 has become inaccessible, for example by simulating a card removal. If the "cancel" option is selected by the user, the channel manager component 330 is not notified as it is not required to take any action in response. Alternatively, mobile device 140 may notify the channel manager component 330 if the "cancel" option is selected If at step 745 the command received from mobile device 140 corresponds to selection of a particular device for disconnection, then at step 755, SCR 110 causes the secure session that the relevant device has with memory card 120 to be terminated. In so doing, SCR 110 may notify the device that the memory card 120 has become inaccessible, for example due to a card removal. The command issued by mobile device 140 to SCR 110 to terminate another device's session may include a command APDU to be provided to the memory card 120, assuming that a secure session can subsequently be established between the memory card 120 and mobile device 140. This way, if the mobile device 140 can establish a secure session with memory card, the SCR 110 can immediately provide the command APDU to memory card 120. Otherwise, the SCR 110 may inform the mobile device 140 that the session has been established and then wait to receive the first command to send to the memory card 120.

Following termination of the session at step 755, step 730 is then performed again, in order to determine that a logical channel is available by which the second accessing device can establish a secure session with memory card 120. This check is performed again in case another accessing device has taken the logical channel that became available immediately following performance of step 755.

Where a logical channel is determined to be available at step 730, then at step 760, the SCR 110 issues an open channel command to memory card 120 to enable mobile device 140 to establish a secure session with memory card 120. Memory card 120 then assigns a logical channel to the mobile device at step 765. At step 770, the mobile device communicates with the memory card 120 to accomplish its desired function and, once it is finished, mobile device 140 and SCR 110 cooperate to close the session at step 775.

Where a logical channel becomes available (step 730) or is assigned (step 765) or closed (step 775), the connection table is updated accordingly. Following steps 725 or 775, steps 705 to 775 are repeated as necessary for any subsequent session request from an accessing device.

Method 700 assumes that if channel management is supported by memory card 120, then only logical channels will be assigned for secure sessions. However, in alternative embodiments, the basic channel may be used in addition to the logical channels for creation of secure sessions. In such embodiments, step 730 comprises checking for availability of the basic channel as well as any logical channel.

Figure 8:
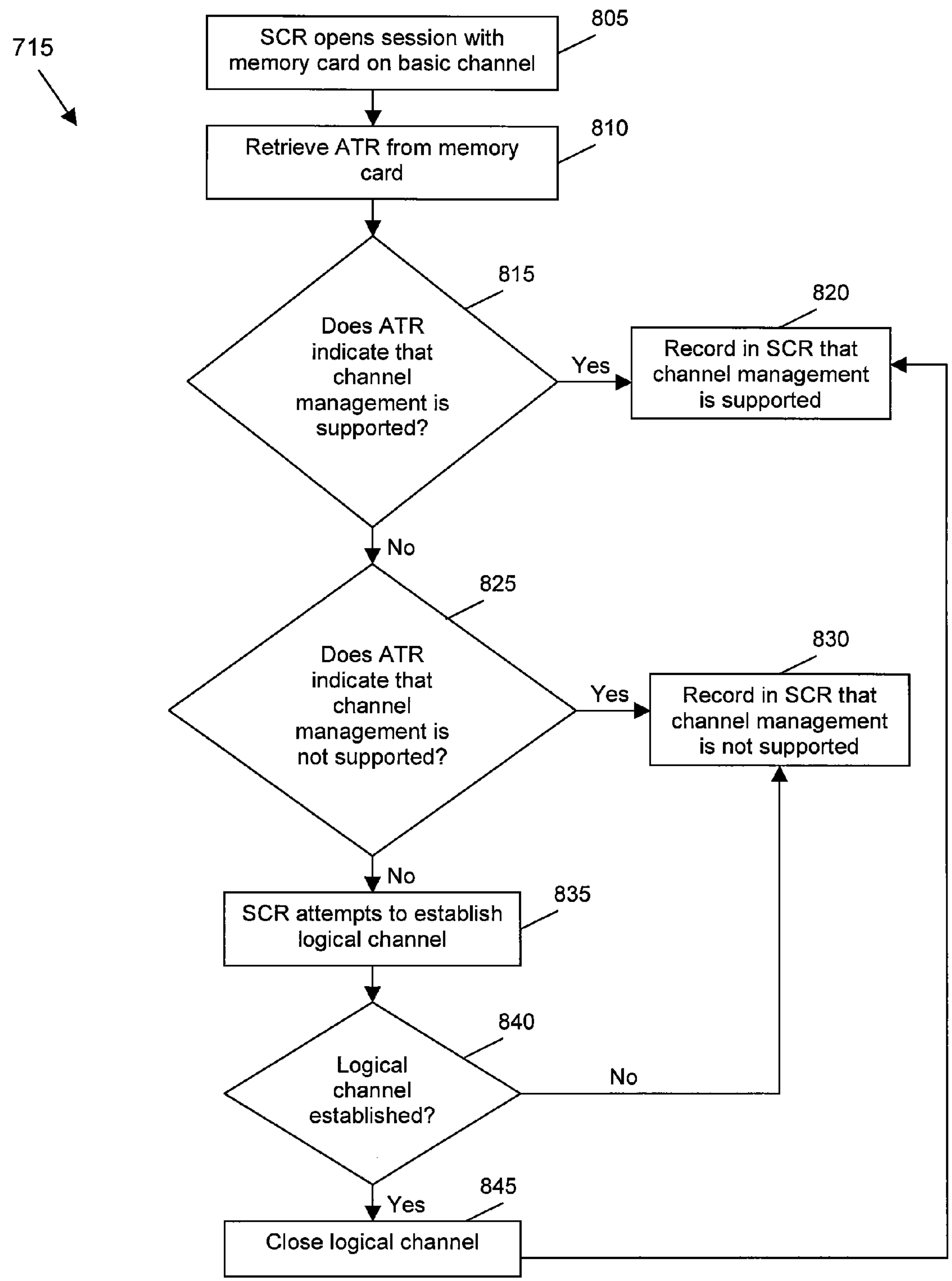
FIG. 8 is a flowchart of a method of determining whether a smart card supports creation of logical channels.

Referring now to FIG. 8, subprocess 715 is described in further detail. Subprocess 715 begins at step 805, at which the SCR 110 opens a session with memory card 120 on the basic channel and, at step 810, retrieves the ATR from memory card 120.

Once the SCR 110 retrieves the ATR, it checks, at step 815, whether the ATR indicates that channel management is supported by the memory card 120. This may be done, for example, by checking a certain portion of the ATR and comparing it with data for other ATR's associated with memory cards that are known to either support or not support channel management. If, at step 815, the data in the ATR indicates that channel management is supported, then at step 820, the SCR 110 records that channel management is supported by memory card 120 by setting a boolean channel management value to true.

If the ATR does not indicate that channel management is supported, then at step 825, SCR 110 checks whether the ATR indicates that channel management is not supported. If channel management is not supported, then at step 830, SCR 110 records that channel management is not supported by setting the channel management value to false.

If the ATR does not indicate that channel management is not supported, then at step 835, the SCR 110 tests the memory card 120 for channel management support by attempting to establish a logical channel with memory card 120 by transmitting a MANAGE_CHANNEL command.

At step 840, SCR 110 checks whether a logical channel has been established at 835, for example, by checking for an acknowledgment (that may include a channel assignment) or an error message in response. If the SCR 110 determines at step 840 that it was unable to establish a logical channel, then SCR 110 performs step 830 to record that channel management is not supported. On the other hand, if at step 840 the SCR 110 can confirm that a logical channel was established with memory card 120 in response to the MANAGE_CHANNEL command, then SCR 110 concludes that channel management is supported, proceeds to close the logical channel at step 845 (as it is no longer required) and performs step 820 to record that channel management is supported.

Figure 9:
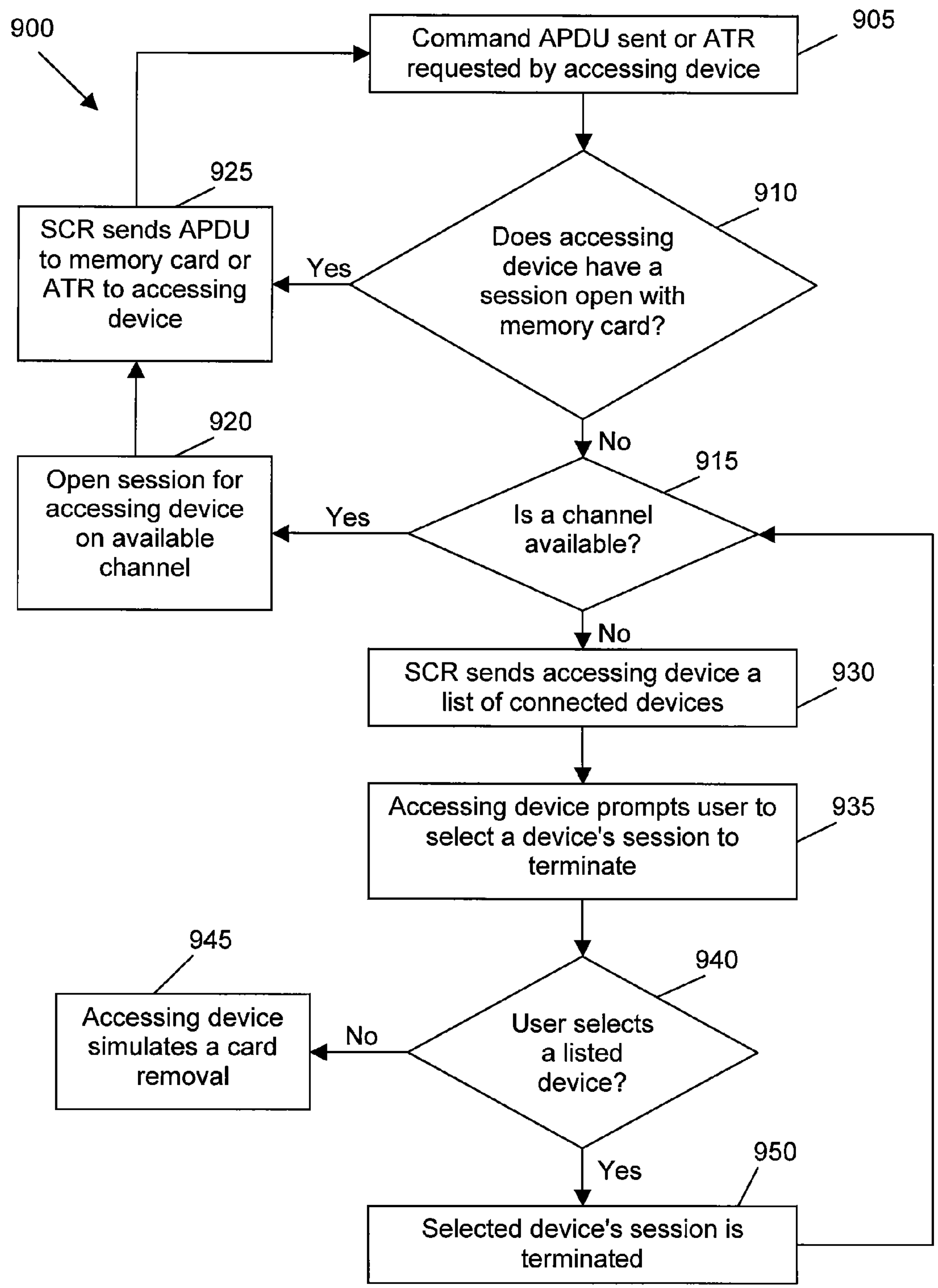
FIG. 9 is a flowchart of a further method of managing access to a smart card.

Referring now to FIG. 9, a further method 900 of managing access to a smart card is described. Method 900 is similar to method 700, except that it does not check whether channel management is supported, nor does it distinguish between the basic channel and a logical channel when checking whether a channel is available. Method 900 assumes that the accessing device 130, 140 has sent a session request on a fire-and-forget basis (i.e., without requiring information as to the session status or an acknowledgement of the session request). In this case, the accessing device 130,140 assumes that a secure session has been established with memory card 120 via SCR 110 in response to the session request and proceeds to transmit a command APDU or a request for the ATR of memory card 120 (if it did not already cache the ATR) to SCR 110, at step 905.

Once SCR 110 receives the command APDU or ATR request, then at step 910, the SCR 110 checks the connection table to determine whether the accessing device 130,140 has a secure session open with memory card 120. If a session is already open, then at step 925, the SCR 110 simply sends the command APDU to memory card 120 or sends the ATR retrieved from memory card 120 to accessing device 130,140.

If at step 910 SCR 110 determines that a session is not yet open between the accessing device 130,140 and the memory card 120, then at step 915 SCR 110 determines whether a channel (basic or logical) is available to establish a secure session. If a channel is available, then at step 920, SCR 110 opens a secure session with memory card 120 for accessing device 130, 140 on the available channel. Where channel management is not supported by memory card 120, the only such available channel would be the basic channel. Where channel management is supported, a channel may be available if the basic channel and the maximum permitted number of logical channels are not already in use by other accessing devices 130 or 140.

Where SCR 110 determines at step 915 that a channel is not available, then at step 930 SCR 110 checks the connection table (if channel management is supported) and sends to the accessing device 130, 140 the names of the connected devices for which secure sessions have been established with memory card 120. For some embodiments, if channel management is not supported, then the connection table is not created to track the multiple connections and sessions. In such embodiments, the SCR 110 only needs to provide a one-member list of connected devices to the accessing device 130, 140, at step 930.

Figure 10:
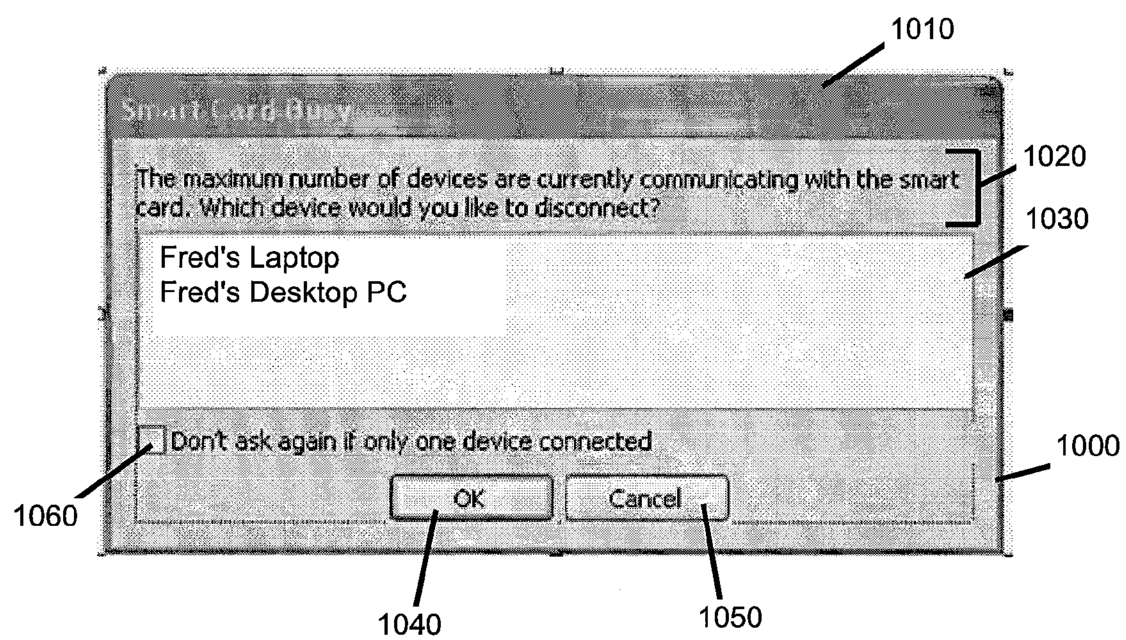
FIG. 10 is an example screenshot of a user selection window.

In response to receipt of the list of connected devices, the accessing device 130, 140 prompts the user to select a device to terminate its session, at step 935. This prompt is made by way of a display window 1000, as shown in FIG. 10, displaying the connected devices by device name as an itemized list 1030. From display window 1000, the user has the option to select one of the listed devices or to not select any of the listed devices, thereby canceling the session request.

At step 940, SCR 110 awaits receipt of a command or other form of communication from accessing device 130, 140 corresponding to a user selection of one of the listed devices or, optionally, cancellation of the session request. If the user has elected to cancel the session request, then at step 945, accessing device 130, 140 simulates a card removal or other status descriptor indicating that the memory card 120 is inaccessible to SCR 110. If SCR 110 receives a response from accessing device 130, 140 that indicates that the user has not selected one of the listed devices and instead has opted to cancel the session request, then at step 945 SCR 110 takes no further action and does not update the connection table.

If the command or other communication received by SCR 110 at step 940 corresponds to user selection of one of the listed devices, then at step 950 SCR 110 co-operates with memory card 120 to terminate the secure session of the selected device. SCR 110 notifies the selected device of the termination of the session, for example, by simulating a card removal or other status indicative of the memory card 120 being inaccessible. Following step 950, SCR 110 again performs step 915 to check whether a channel is available, just in case another accessing device may have opened a session on the channel as soon as it became available. Assuming that a channel is available as a result of the session termination at step 950, the accessing device 130, 140 will be allowed to open a secure session on the available channel at step 920 and the original APDU will be sent to the memory card 120 at step 925, if applicable.

If SCR 110 stores a connection table, then following the change in session status at step 920 or 950, the connection table is updated to reflect the termination of one or more channels associated with one device and creation of a new session on a newly available channel by the accessing device 130, 140, as appropriate.

Referring now to FIG. 10, there is shown an example screen shot of a user selection window comprising display window 1000. Display window 1000 may comprise a title or banner 1010 at the top, including descriptive title text, such as "smart card busy", indicative of the status that has given rise to the user input prompt at step 740 or 935. Further descriptive text 1020 is provided beneath the banner 1010 to explain the reason for the appearance of the display window 1000. For example, such descriptive text may be "The maximum number of devices are currently communicating with the smart card. Which device would you like to disconnect?"

The display window 1000 further comprises a list 1030 of devices indicated by SCR 110 to currently have secure sessions established with memory card 120. List 1030 may comprise only a single device or may contain as many different devices as the number of channels that memory card 120 can support, such as four. As shown in FIG. 10, list 1030 comprises two devices: "Fred's Laptop" and "Fred's Desktop PC". Where a mobile device 140 is attempting to establish a secure session, the mobile device 140 is not displayed in list 1030 because a session has not yet been established for it.

In response to display window 1000 being displayed, the user may select one of the devices in list 1030 using an appropriate user input component on accessing device 130, 140. The user may then click an "OK" button 1040 to cause accessing device 130, 140 to send a command or other communication to SCR 110, indicating that the user would like to terminate the session of the device selected from list 1030. Button 1040 may comprise text other than "OK" such as "disconnect", for example.

If the user elects not to terminate the session of one of the devices in list 1030, then the user may select a "cancel" button 1050. In response to selection of button 1050, accessing device 130, 140 treats the memory card 120 as being inaccessible, for example, by simulating a card removal. The accessing device 130, 140 may also communicate with SCR 110 to indicate that the session request has been cancelled.

Display window 1000 further comprises a toggling option, for example, in the form of a checkbox, to allow the user to set a preference in relation to further display of display window 1000. Toggling option 1060 may be accompanied by text such as "don't ask again if only one device connected." Toggling option 1060, if selected (i.e., turned on) and the "OK" button 1040 is selected, will cause automatic termination of an existing session where there is only one device using the session. This may avoid unnecessary user interaction where the memory card 120 does not support channel management, for example. If the user turns on toggling option 1060, then, in subsequent performance of method 700 or 900, steps 735 to 750 and 930 to 945 would not be performed, instead proceeding directly to termination of the session of the single connected device at step 755 or 950, respectively.

Display window 1000 may be maintained or cancelled dynamically, according to the availability (or lack thereof) of a channel on which the accessing device 130, 140 can establish the session. Thus, if one of the secure sessions is ended while display window 1000 is displayed on the user interface of accessing device 130, 140, channel manager component 330 will automatically attempt to establish a secure session with the memory card 120 for the accessing device 130, 140 and will notify the accessing device 130, 140 accordingly.

Alternatively, instead of the channel manager component 330 automatically trying to establish a secure session between mobile device 140 and memory card 120, channel manager component 330 may simply notify all devices connected to SCR 110 that a session may now be established with memory card 120 and then let a specific accessing device 130, 140 make an explicit session request. If the display window 1000 is no longer necessary, for example because a logical channel has become available, accessing device 130, 140 ceases displaying display window 1000.

Further, where the user selects a device from list 1030 for session termination but the session cannot be closed (e.g. because the device is no longer connected to SCR 110) or the terminated session is taken by another accessing device, display window 1000 will continue to appear to enable the user to select another device for session termination. Thus, while display window 1000 continues to be displayed, list 1030 will continue to be updated (via communication between channel manager component 330 and accessing device 130, 140) to reflect changes in the connection and/or session status of devices connected to memory card 120.

It should be understood that variations and modifications can be made to the embodiments described and illustrated herein without departing from the spirit of the described embodiments, the general scope of which is defined in the appended claims.

The invention claimed is:

1. A card reader device for managing access to a memory card by a plurality of accessing devices, the card reader device comprising:

a processor;

a wireless communication interface responsive to the processor for communicating with the plurality of accessing devices; and a memory card interface for enabling communication between the processor and the memory card;

wherein, when at least a first secure session is open between at least a first accessing device and the memory card on a first channel, and the card reader device receives an open session command from a second accessing device, the processor is configured to:

determine whether a second channel is available to support a second secure session contemporaneously with at least the first secure session, if the second channel is unavailable, determine all secure sessions established with the memory card, provide a list identifying accessing devices corresponding to the all secure sessions to the second accessing device for display in a user interface of the second accessing device, prompt for a selection of an accessing device identified in the list, and terminate a secure session of the selected accessing device in response to the selection.

2. The device of claim 1, wherein the memory card is not configured to support a plurality of contemporaneous sessions.

3. The device of claim 1, further comprising a memory, the memory storing a connection table, wherein the connection table comprises entries for each session established between the memory card and a respective accessing device.

4. The device of claim 3, wherein the connection table comprises, for each session entry, one or more channel entries.

5. The device of claim 1, wherein the memory card interface comprises a channel manager, and wherein the channel manager controls the channels that can be opened between the memory card and the plurality of accessing devices so that a total number of channels is limited to a predetermined number.

6. The device of claim 1, wherein the plurality of accessing devices comprises one or more additional accessing devices each having a secure session established with the memory card.

7. The device of claim 1, wherein the secure session of the selected accessing device is terminated by simulating loss of connection between the memory card and the card reader device.

8. The device of claim 1, further comprising a serial interface for wired communication with one of the plurality of accessing devices.

9. The device of claim 1, further comprising a socket for receiving the memory card and electrically coupling the processor and the memory card.

10. The device of claim 1, wherein the memory card interface enables wireless communication between the card reader device and the memory card.

11. The device of claim 1, wherein the memory card comprises a smart card.

12. A method of managing communication between a memory card and a plurality of accessing devices when at least a first secure session is established, the plurality of accessing devices comprising at least a first accessing device and a second accessing device, the first secure session being established between the memory card and the first accessing device on a first channel, the method comprising:

receiving, at a card reader device in communication with the memory card, an open session command from the second accessing device to open a second secure session with the memory card;

determining whether a second channel is available to support the second secure session with the second accessing device contemporaneously with at least the first secure session;

if the second channel is unavailable, determining all secure sessions established with the memory card, providing a list identifying accessing devices corresponding to the all secure sessions to the second accessing device for display in a user interface of the second accessing device, prompting for a selection of an accessing device identified in the list, and terminating a secure session of the selected accessing device in response to the selection.

13. The method of claim 12, wherein the memory card is not configured to support a plurality of contemporaneous sessions.

14. The method of claim 12, further comprising storing a connection table in a memory of the card reader device, wherein the connection table comprises entries for each session established between the memory card and a respective accessing device.

15. The method of claim 14, wherein the connection table comprises, for each session entry, one or more channel entries.

16. The method of claim 12, further comprising controlling the channels that can be opened between the memory card and the plurality of accessing devices so that a total number of channels is limited to a predetermined number.

17. The method of claim 12, wherein the terminating comprises simulating loss of connection between the memory card and the card reader device.

18. The method of claim 12, wherein the plurality of accessing devices comprises one or more additional accessing devices each having a secure session established with the memory card.

19. A computer readable storage medium storing program instructions which, when executed by a processor on a smart card reader, cause the processor to manage communication between a memory card and a plurality of accessing devices when at least a first secure session is established, the plurality of accessing devices comprising at least a first accessing device and a second accessing device, the first secure session being established between the memory card and the first accessing device on a first channel, wherein the processor is configured to:

receive, at the card reader device in communication with the memory card, an open session command from the second accessing device to open a second secure session with the memory card;

determine whether a second channel is available to support the second secure session with the second accessing device contemporaneously with at least the first secure session;

if the second channel is unavailable, determine all secure sessions established with the memory card, provide a list identifying accessing devices corresponding to the all secure sessions to the second accessing device for display in a user interface of the second accessing device, prompt for a selection of an accessing device identified in the list, and terminate a secure session of the selected accessing device in response to the selection.

20. A card reader device for managing access to a memory card by a plurality of accessing devices when at least a first secure session is established, the plurality of accessing devices comprising at least a first accessing device and a second accessing device, the first secure session being established between the memory card and the first accessing device on a first channel, the card reader device comprising:

means for receiving, at a card reader device in communication with the memory card, an open session command from the second accessing device to open a second secure session with the memory card;

means for determining whether a second channel is available to support the second secure session with the second accessing device contemporaneously with at least the first secure session;

if the second channel is unavailable, means for determining all secure sessions established with the memory card, means for providing a list identifying accessing devices corresponding to the all secure sessions to the second accessing device for display in a user interface of the second accessing device, means for prompting for a selection of an accessing device identified in the list, and means for terminating a secure session of the selected accessing device in response to the selection.

* * * * *